US009846622B1

(12) United States Patent
Roguine et al.

(10) Patent No.: US 9,846,622 B1
(45) Date of Patent: Dec. 19, 2017

(54) PARALLEL COMPUTER SYSTEM RECOVERY

(71) Applicant: Acronis International GmbH, Schaffhausen (CH)

(72) Inventors: Stanislav Roguine, Candia, NH (US); Stanislav ProtaSov, Moscow (RU); Mark Shmulevich, Moscow (RU); Serguei M. Beloussov, Costa Del Sol (SG)

(73) Assignee: Acronis International GmbH (CH)

( * ) Notice: Subject to any disclaimer, the term of this patent is extended or adjusted under 35 U.S.C. 154(b) by 118 days.

(21) Appl. No.: 14/986,184

(22) Filed: Dec. 31, 2015

(51) Int. Cl.
 *G06F 11/07* (2006.01)
 *G06F 11/14* (2006.01)
(52) U.S. Cl.
 CPC .... *G06F 11/1469* (2013.01); *G06F 2201/805* (2013.01); *G06F 2201/84* (2013.01)
(58) Field of Classification Search
 CPC .......................... G06F 11/1469; G06F 11/1458
 USPC ...................................... 714/15, 20
 See application file for complete search history.

(56) References Cited

U.S. PATENT DOCUMENTS

| 6,671,821 | B1 * | 12/2003 | Castro ............... G06F 17/30212 |
| | | | 707/E17.007 |
| 7,047,380 | B2 | 5/2006 | Tormasov et al. |
| 7,246,211 | B1 | 7/2007 | Beloussov et al. |
| 7,275,139 | B1 | 9/2007 | Tormasov et al. |
| 7,281,104 | B1 | 10/2007 | Tsypliaev et al. |
| 7,318,135 | B1 | 1/2008 | Tormasov et al. |
| 7,353,355 | B1 | 4/2008 | Tormasov et al. |
| 7,366,859 | B2 | 4/2008 | Per et al. |
| 7,475,282 | B2 | 1/2009 | Tormasov et al. |
| 7,603,533 | B1 | 10/2009 | Tsypliaev et al. |
| 7,636,824 | B1 | 12/2009 | Tormasov |
| 7,650,473 | B1 | 1/2010 | Tormasov et al. |
| 7,721,138 | B1 | 5/2010 | Lyadvinsky et al. |
| 7,769,844 | B2 * | 8/2010 | Miller .................... H04L 29/06 |
| | | | 709/224 |
| 7,779,221 | B1 | 8/2010 | Tormasov et al. |
| 7,831,789 | B1 | 11/2010 | Tsypliaev et al. |
| 7,886,120 | B1 | 2/2011 | Tormasov |
| 7,895,403 | B1 | 2/2011 | Tormasov et al. |
| 7,934,064 | B1 | 4/2011 | Per et al. |
| 7,937,612 | B1 | 5/2011 | Tormasov et al. |
| 7,949,635 | B1 | 5/2011 | Korshunov et al. |
| 7,953,948 | B1 | 5/2011 | Dyatlov et al. |
| 7,979,690 | B1 | 7/2011 | Dyatlov et al. |
| 8,005,797 | B1 | 8/2011 | Chepel et al. |
| 8,051,044 | B1 | 11/2011 | Dyatlov et al. |
| 8,069,320 | B1 | 11/2011 | Per et al. |
| 8,073,815 | B1 | 12/2011 | Korshunov et al. |
| 8,074,035 | B1 | 12/2011 | Per et al. |

(Continued)

*Primary Examiner* — Chae Ko
(74) *Attorney, Agent, or Firm* — K&L Gates LLP

(57) ABSTRACT

Systems and methods for parallel computer system recovery are described. The method may include receiving requests for backup data at a storage server from a plurality of computer systems to be recovered. The method may further include determining a next data fragment of the backup data to be transmitted from the storage server to the plurality of computer systems based on an order of priority. The method may also include transmitting the next data fragment from the storage server to the plurality of computer systems via a data fragment multicast stream.

20 Claims, 6 Drawing Sheets

(56) References Cited

U.S. PATENT DOCUMENTS

| | | | |
|---|---|---|---|
| 8,121,874 B1 * | 2/2012 | Guheen | G06Q 10/063 705/28 |
| 8,145,607 B1 | 3/2012 | Korshunov et al. | |
| 8,180,984 B1 | 5/2012 | Per et al. | |
| 8,225,133 B1 | 7/2012 | Tormasov et al. | |
| 8,261,035 B1 | 9/2012 | Tormasov et al. | |
| 8,296,264 B1 | 10/2012 | Yeresov et al. | |
| 8,312,259 B1 | 11/2012 | Dyatlov et al. | |
| 8,347,137 B1 | 1/2013 | Chepel et al. | |
| 8,484,427 B1 | 7/2013 | Lyadvinsky et al. | |
| 8,645,748 B1 | 2/2014 | Chepel et al. | |
| 8,732,121 B1 | 5/2014 | Zorin et al. | |
| 8,856,927 B1 | 10/2014 | Beloussov et al. | |
| 8,886,601 B1 * | 11/2014 | Landau | G06F 17/30575 707/613 |
| 8,996,830 B1 | 3/2015 | Lyadvinsky et al. | |
| 9,189,492 B2 * | 11/2015 | Ducott, III | G06F 17/30578 |
| 9,679,011 B2 * | 6/2017 | Dixit | G06F 17/30466 |
| 2004/0236869 A1 * | 11/2004 | Moon | H04L 67/104 709/246 |
| 2006/0225065 A1 | 10/2006 | Chandhok et al. | |
| 2009/0196169 A1 * | 8/2009 | Shi | G06F 17/30097 370/218 |
| 2010/0011178 A1 | 1/2010 | Feathergill | |
| 2010/0115332 A1 * | 5/2010 | Zheng | G06F 11/1461 714/6.2 |
| 2012/0303998 A1 * | 11/2012 | Sun | G06F 11/2041 714/4.11 |
| 2014/0304553 A1 * | 10/2014 | Gondi | G06F 11/0751 714/39 |
| 2015/0121122 A1 * | 4/2015 | Towstopiat | G06F 11/1471 714/4.11 |
| 2015/0370643 A1 * | 12/2015 | Rueger | G06F 11/1446 707/652 |
| 2015/0370656 A1 * | 12/2015 | Tsafrir | G06F 11/1088 714/6.3 |

* cited by examiner

| Hash | Agents Collection |
|---|---|
| Hash #1 | 1,2,3 |
| Hash #2 | 2,3 |
| Hash #3 | 1 |

FIG. 5

| Step | Action | Hash Queue |
|---|---|---|
| 1 | Agent A starts recovery, and requests Backup A1, comprising of data fragments X, Y and Z | X – A<br>Y – A<br>Z – A |
| 2 | Storage Server sends block X and removes X from hash queue | Y – A<br>Z – A |
| 3 | Agent B starts recovery of the system, and requests Backup B1, comprising of data fragments Z, Y, X and V | Y – A,B<br>Z – A,B<br>X – B<br>V – B |
| 4 | Storage Server sends block Y and removes Y from hash queue | Z – A,B<br>X – B<br>V – B |
| 5 | Storage Server sends block Z and removes Z from hash queue | X – B<br>V – B |
| 6 | Storage Server sends blocks X and V. | Empty |

FIG. 6

PARALLEL COMPUTER SYSTEM RECOVERY

TECHNICAL FIELD

The technical field may generally relate to recovery of computer systems and more particularly to increasing the speed of recovery.

BACKGROUND

Computer systems may run business critical or other applications. In the event of a failure, a recovery of the computer system may be initiated. The recovery of a computer system from a storage server may be time consuming, especially if there is a large amount of data that needs to be transferred from the storage system to the computer system being recovered. Further, for a given number of computing systems on a network, restoring a large amount of data may take longer depending on various network characteristics such as data transfer speed. As such, in a major disaster situation in a large network environment, recovery of a significant number of computer systems may take long periods of time. Consequently, techniques and features to increase the speed of recovery of multiple computer systems in a network may be desired.

BRIEF SUMMARY

In an embodiment, a method for parallel computer system recovery may include receiving requests for backup data at a storage server from a plurality of computer systems to be recovered. The method may further include determining a next data fragment of the backup data to be transmitted from the storage server to the plurality of computer systems based on an order of priority. The method may also include transmitting the next data fragment from the storage server to the plurality of computer systems via a data fragment multicast stream.

One or more of the following features may be included. The method may further include adding a collection of hashes corresponding to the backup data to a hash queue at the storage server. The method may also include transmitting a collection of hashes corresponding to the backup data from the storage server to a computer system requesting the backup data. The method may additionally include transmitting a hash corresponding to the next data fragment to the plurality of computer systems. Moreover, the method may include receiving the requests for backup data from the plurality of computer systems at near the same time for synchronous recovery of the plurality of computer systems. Additionally, the method may include receiving the requests for backup data from the plurality of computer systems at different times for asynchronous recovery of the plurality of computer systems. Further, the method may include requesting a recovery status from the plurality of computer systems via a keep-alive multicast stream. The order of priority may based on the data fragments of the backup data which have been requested by the most computer systems.

In an embodiment, a computer program product may reside on a computer readable storage medium and may have a plurality of instructions stored on it. When executed by a processor, the instructions may cause the processor to perform operations for parallel computer system recovery. The operations may include receiving requests for backup data at a storage server from a plurality of computer systems to be recovered. The operations may further include determining a next data fragment of the backup data to be transmitted from the storage server to the plurality of computer systems based on an order of priority. The operations may also include transmitting the next data fragment from the storage server to the plurality of computer systems via a data fragment multicast stream.

One or more of the following features may be included. The operations may include adding a collection of hashes corresponding to the backup data to a hash queue at the storage server. The operations may further include transmitting a collection of hashes corresponding to the backup data from the storage server to a computer system requesting the backup data. The operations may also include transmitting a hash corresponding to the next data fragment to the plurality of computer systems. The operations may additionally include receiving the requests for backup data from the plurality of computer systems at near the same time for synchronous recovery of the plurality of computer systems.

In an embodiment, a computing system for parallel computer system recovery may include one or more processors. The one or more processors may be configured to receive requests for backup data at a storage server from a plurality of computer systems to be recovered. The one or more processors may be further configured to determine a next data fragment of the backup data to be transmitted from the storage server to the plurality of computer systems based on an order of priority. The one or more processors may also be configured to transmit the next data fragment from the storage server to the plurality of computer systems via a data fragment multicast stream.

One or more of the following features may be included. The one or more processors may be configured to add a collection of hashes corresponding to the backup data to a hash queue at the storage server. The one or more processors may also be configured to transmit a collection of hashes corresponding to the backup data from the storage server to a computer system requesting the backup data.

In an embodiment, a method for parallel computer system recovery may include requesting backup data comprising a plurality of data fragments from a storage server. The method may further include receiving a hash collection corresponding to the plurality of data fragments from the storage server. The method may also include receiving a data fragment of the plurality of data fragments from the storage server at a computer system via multicast. The method may additionally include, in response to determining that the data fragment is in the hash collection, placing the data fragment in a recovery queue in a memory buffer of the computer system.

One or more of the following features may be included. The method may further include, in response to determining that the data fragment is not in the hash collection, deleting the data fragment. The method may also include restoring the data fragment to the appropriate location in a storage of the computer system. The method may further include transmitting a network message to the storage server reporting a number of data fragments remaining in the recovery queue.

In an embodiment, a computer program product may reside on a computer readable storage medium and may have a plurality of instructions stored on it. When executed by a processor, the instructions may cause the processor to perform operations for parallel computer system recovery. The operations may include requesting backup data comprising a plurality of data fragments from a storage server. The method may further include receiving a hash collection corresponding to the plurality of data fragments from the storage server. The method may also include receiving a data fragment of the plurality of data fragments from the storage server at a computer system via multicast. The method may additionally include, in response to determining that the data fragment is in the hash collection, placing the data fragment in a recovery queue in a memory buffer of the computer system.

One or more of the following features may be included. The operations may include, in response to determining that the data fragment is not in the hash collection, deleting the data fragment. The operations may also include restoring the data fragment to the appropriate location in a storage of the computer system. The operations may further include transmitting a network message to the storage server reporting a number of data fragments remaining in the recovery queue.

In an embodiment, a computing system for parallel computer system recovery may include one or more processors. The one or more processors may be configured to request backup data comprising a plurality of data fragments from a storage server. The one or more processors may be further configured to receive a hash collection corresponding to the plurality of data fragments from the storage server. The one or more processors may also be configured to receive a data fragment of the plurality of data fragments from the storage server at a computer system via multicast. The one or more processors may be additionally be configured to, in response to determining that the data fragment is in the hash collection, place the data fragment in a recovery queue in a memory buffer of the computer system.

The details of one or more implementations are set forth in the accompanying drawings and the description below. Other features and advantages will become apparent from the description, the drawings, and the claims.

BRIEF DESCRIPTION OF THE DRAWINGS

FIG. 5 illustrates an example hash queue in accordance with the present disclosure; and FIG. 6 illustrates example operations of a parallel recovery process in accordance with the present disclosure.

DETAILED DESCRIPTION

Overview

Figure 1:
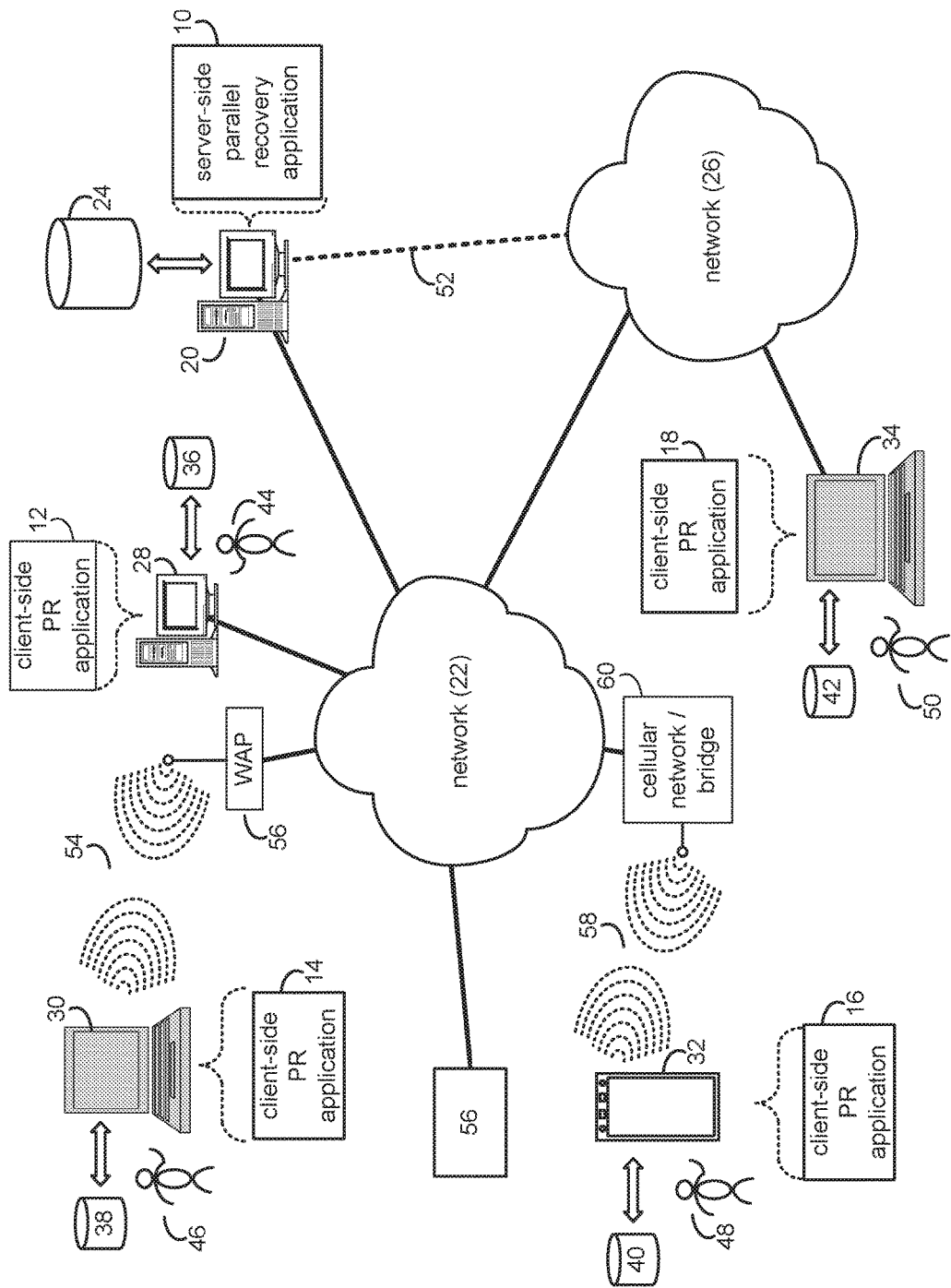
FIG. 1 depicts an example system that can execute implementations of the present disclosure.

A system administrator may institute backup and recovery procedures to ensure persistence of applications, data, or other resources accessed through one or more computer systems, which may be physical or virtual machines. For example, a backup archive of the computer system may be created and stored onsite or offsite and may include the entire content of the computer system before it failed. Efficient recovery of computer systems may be critical for proper business or other operations of an organization as application and data demands are likely to continue in the event of a computer system failure.

During a backup, deduplication techniques may be used to reduce the amount of data transferred or transmitted. For example, a hash calculation of backed up data blocks on the client side may be performed and it may be verified that the server, which may include storage that keeps the backed up data, does or does not have the same data. Blocks may be backed up by first comparing a client-computed hash and a hash from the server. Hashes existing on the server may be checked against hashes of data for backup on a client. Hashes sent during backup may be added to a cache and the blocks need not be sent again in a later backup if they have already been added to the cache (i.e., the blocks have been saved already).

As such, recovery of multiple computer systems needing common data fragments to be restored may be sped up by multicasting the common data fragments over the network. For example, internet protocol (IP) multicast may be leveraged during a recovery process to deliver duplicate data to multiple computer systems being restored. In this manner, the speed of recovery may be greatly increased, as duplicated data blocks may be sent only once to multiple computer systems.

Typically, each recovery stream for multiple computer systems in a network are transmitted from a storage server independently and each recovery stream runs in parallel to the other recovery streams. For example, recovery of K computer systems may require restoring D bytes of data. Each of the K computer systems may thus require transfer of K*D bytes of data through the network. If the network is capable of sending S bytes of data per second, the network will require K*D/S seconds for recovery. In major disaster situations of large network environments, recovery of a significant number of computer systems will take long periods of time.

In larger environments, many computer systems and data sets may have duplicate data that needs to be restored to multiple computer systems. Using the techniques and features described herein, processes on both the sending side (e.g., storage server) and receiving sides (e.g., computer systems/agents) of the network may be used to leverage multicast capabilities and send duplicate data fragments from the storage server to multiple computer systems only once. As discussed above, the storage server may perform deduplication of data during backup. During recovery the storage server may perform a reverse process of deduplication referred to as rehydration.

In an embodiment of the present disclosure, the computer system agents and/or storage server may run a process, as described below, to negotiate a set of data fragments during recovery. The storage server may send duplicate data to multiple computer system agents simultaneously. For example, if each of K computer systems in the network has U bytes of data unique to each other and P bytes of data which are duplicate, the storage server may only need to transfer K*U+P bytes of data during recovery through the network. If the network is capable of sending S bytes of data per second, (K−1)*P/S seconds may be saved as compared to conventional recovery methods.

In view of the forgoing, there may be a need for systems and methods which reduce the speed of recovery of multiple computer systems in a network. In some systems, the techniques and features described herein may allow for reducing the speed of recovery of multiple computer systems in a network using multicasting capabilities.

Referring to FIG. 1, there is shown a server-side parallel recovery (PR) application 10 and client-side parallel recovery applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as parallel recovery process 10. Further, one or more of client applications 12, 14, 16, and 18 may be referred to as a process configured to carry out one or more of the features described herein, such as parallel recovery processes 12, 14, 16, and/or 18.

As will be discussed below and referring now to FIG. 2, parallel recovery process 10 may receive 200 requests for backup data at a storage server from a plurality of computer systems to be recovered. Parallel recovery process 10 may also determine 202 a next data fragment of the backup data to be transmitted from the storage server to the plurality of computer systems based on an order of priority. Parallel recovery process 10 may further transmit 204 the next data fragment from the storage server to the plurality of computer systems via a data fragment multicast stream.

The parallel recovery process may be a server-side process (e.g., server-side parallel recovery process 10), a client-side process (e.g., client-side parallel recovery process 12, client-side parallel recovery process 14, client-side parallel recovery process 16, or client-side parallel recovery process 18), or a hybrid server-side/client-side process (e.g., a combination of server-side parallel recovery process 10 and one or more of client-side parallel recovery processes 12, 14, 16, 18).

System Overview

Referring to FIG. 1, server-side parallel recovery process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side parallel recovery process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side parallel recovery processes 12, 14, 16, 18 may reside on and may be executed by client electronic devices 28, 30, 32, and/or 34 (respectively), examples of which may include but are not limited to various computer systems such as personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side parallel recovery processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side parallel recovery processes 12, 14, 16, 18 and/or server-side parallel recovery process 10 may be processes that run within (i.e., are part of) a cloud computing site, cloud computing application, cloud platform, or cloud environment. Alternatively, client-side parallel recovery processes 12, 14, 16, 18 and/or server-side parallel recovery process 10 may be stand-alone applications that work in conjunction with the cloud computing site, cloud computing application, cloud platform, or cloud environment. One or more of client-side parallel recovery processes 12, 14, 16, 18 and server-side parallel recovery process 10 may interface with each other (via network 22 and/or network 26).

Users 44, 46, 48, 50 may access server-side parallel recovery process 10 directly through the device on which the client-side parallel recovery process (e.g., client-side parallel recovery processes 12, 14, 16, 18) is executed, namely client electronic devices 28, 30, 32, 34, for example. Users 44, 46, 48, 50 may access server-side parallel recovery process 10 directly through network 22 and/or through secondary network 26. Further, server computer 20 (i.e., the computer that executes server-side parallel recovery process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Parallel Recovery Process

For the following discussion, server-side parallel recovery process 10 client-side parallel recovery process 12 will be described for illustrative purposes. Server computer 20 may run server-side parallel recovery application 10 to carry out some or all of the techniques and features described herein. Further, client computer 28 may run client-side parallel recovery application 12 to carry out some or all of the techniques and features described here. It should be noted that client-side parallel recovery process 12 may interact with server-side parallel recovery process 10 and may be executed within one or more applications that allow for communication with server-side parallel recovery process 10. However, this is not intended to be a limitation of this disclosure, as other configurations are possible (e.g., stand-alone client-side parallel recovery processes and/or stand-alone server-side parallel recovery processes). For example, some implementations may include one or more of client-side parallel recovery processes 14, 16, and 18 in place of or in addition to client-side parallel recovery process 12.

The systems and methods (e.g., parallel recovery processes 10 and 12) described herein relate to the parallel recovery of multiple computer systems. In part, the systems and methods relate to reducing the amount of time necessary for recovering multiple computer systems on a network. Parallel recovery processes 10, 12, 14, 16, and/or 18 may include or may work in connection with an agent (e.g., a software module), which may include or may be configured to perform any number of the techniques or features described herein. Parallel recovery processes 10, 12, 14, 16, and/or 18 may include a software component, executable code, function, subroutine, or other set of instructions designed to carry out one or more operations for parallel computer system recovery and reducing an amount of time to recover multiple computer systems on a network. For example, parallel recovery process 10 may coordinate a restore process.

Figure 4:
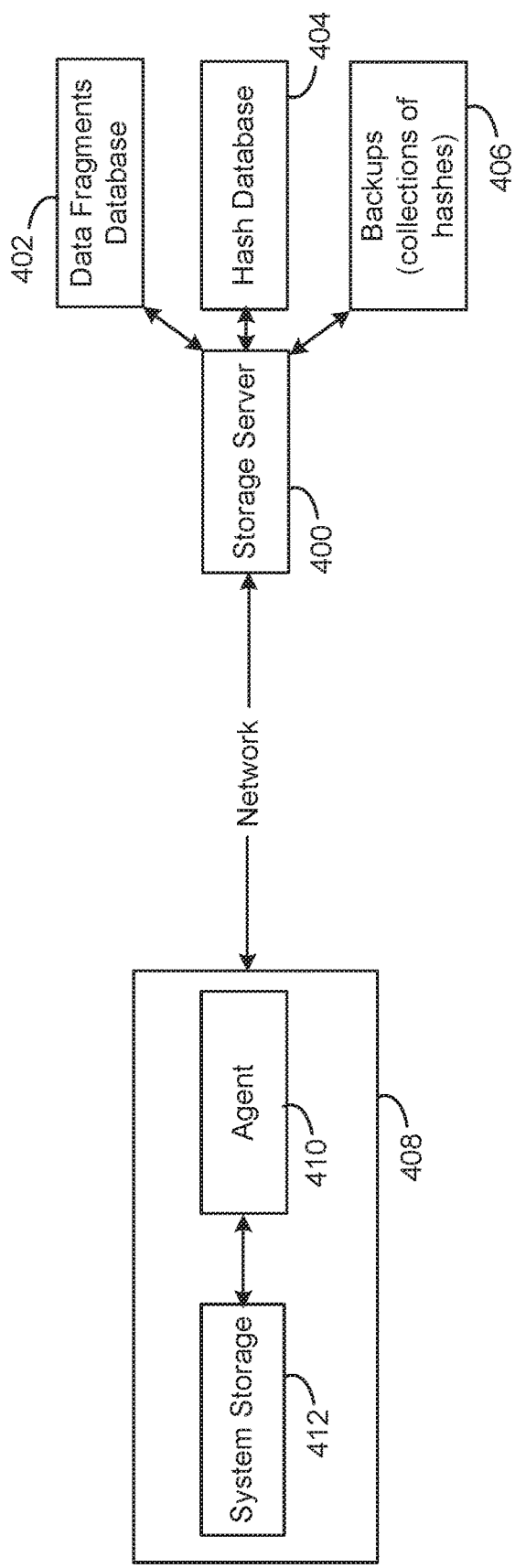
FIG. 4 illustrates an example architecture in accordance with the present disclosure.

Referring now to FIG. 4, an example architecture in accordance with the present disclosure is shown. The example illustrates a network architecture which may be used for parallel computer system recover as described herein. For example, the architecture may include storage server 400, which may include software components or computer logic capable of advanced networking and managing deduplicated data storage. Storage server 400 may transmit data to computer systems on the network or agents of those computer systems during a recovery process. In an embodiment, server computer 20 may be a representation of storage server 400.

The architecture may also include data fragments database 402. A data fragment may be a portion of data from a data stream used for a recovery. Storage server 400 may select data fragments to be multicast from data fragments database 402. The architecture may further include hash database 404 and a backups component 406. A hash may be a control checksum of a data fragment and may uniquely identify the data fragment on the deduplicated storage.

A computer system 408 maybe in communication with storage server 400, as shown. Multiple computer systems may be in communication with storage server 400. Computer system 408 may include a software module or component referred to as an agent (e.g., agent 410). For example, agent 410 or a similar agent may run on each computer system in the network that recovers data and may receive the data from the storage server. The agent may operate inside an already existing operating system or may be from operated from a bootable medium (e.g., CD, DVD, PXE Network Boot, USB/IEEE1394 drives, etc.).

Computer system 408 may also include system storage 412. In an embodiment one of more of client electronic devices 28, 30, 32, 34 may be a representation of computer system 408. Computer system 408 or any other system in the network which may need to be recovered may include a recovery queue, which may refer to a buffer area in RAM of the computer system with an agent which holds data fragments to be recovered on the computer system.

The agent and recovery queue of a computer system in the network may include multiple parameters and be designated one or more statuses during recovery. For example, a recovery queue suspension threshold may refer to a maximum allowed number of the data fragments in an agent's corresponding recovery queue. A recovery queue reactivation threshold may refer to a number of data fragments in an agent's recovery queue which may allow the recovery queue to resume receiving data fragments. An idle agent may refer to an agent that has an empty buffer or recovery queue. An active agent may refer to an agent that can receive items in its recovery queue. A suspended agent may refer to an agent that has reached more or an equal number of data fragments in its recovery queue than a pre-defined suspension threshold, and is entered a suspended status.

Figure 2:
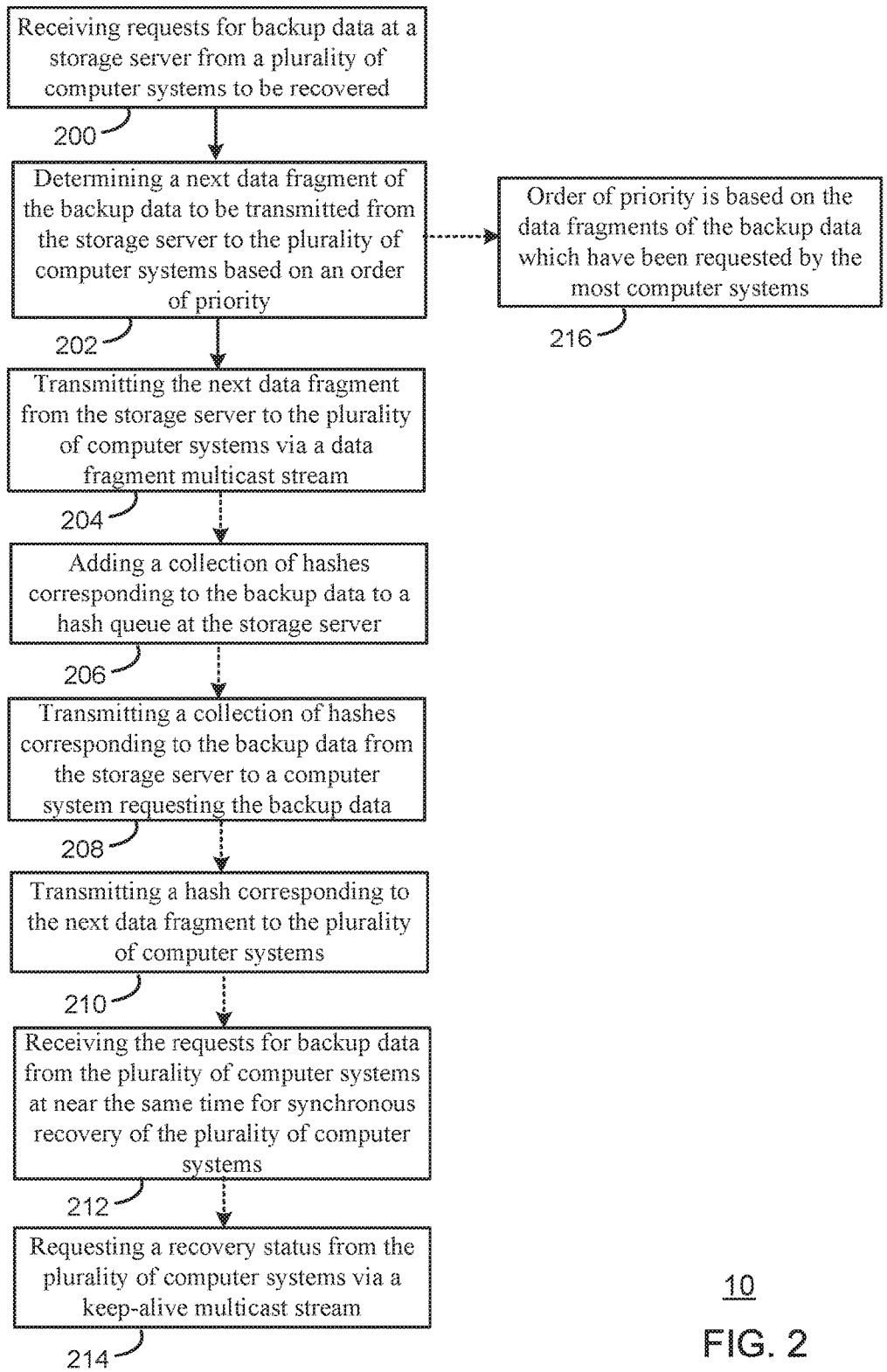
FIG. 2 is a diagrammatic flowchart illustrating an example implementation of the present disclosure.

Referring now to FIG. 2, parallel recovery process 10 may receive 200 requests for backup data at a storage server (e.g., storage server 400) from a plurality of computer systems (e.g., computer system 408) to be recovered. An agent (e.g., agent 410) running on one or more computer systems in the network (e.g., computer system 408) may initiate the recovery process. For example, and referring now also to FIG. 3, parallel recovery process 12 may request 300 backup data including a plurality of data fragments from the storage server (e.g., storage server 400).

Recovery processes for multiple computer systems in the network may be started at any time, including simultaneously, or at different times. The recovery processes described herein may allow for maximum efficiency for both synchronous and asynchronous recovery processes with respect to multiple computer systems in the network. In an embodiment, parallel recovery process 10 and/or storage server 400 may receive 212 the requests for backup data from the plurality of computer systems (i.e., computer systems in the network) at near the same time for synchronous recovery of the plurality of computer systems Parallel recovery process 10 may add 206 a collection of hashes corresponding to the backup data to a hash queue at the storage server. For example, storage server 400 may read a collection of hashes from, e.g., backups component 406, and may add the collection of hashes into a hash queue similar to hash queue 500 shown in FIG. 5. Further, storage server 400 may mark an agent ID (e.g., one or more of agent IDs 504) corresponding to one of the computer systems in the network (e.g., computer system 408) into the collection.

Referring to FIG. 5, for duplicate hash IDs (e.g., hash IDs 502) which may already be requested by other agents (e.g., from recovery operations previously initiated by other computer systems in the network), a corresponding agent ID may be added into the existing collection. The new unique hash IDs may add a row to the queue, and may have only the specific agent ID in the collection.

Figure 3:
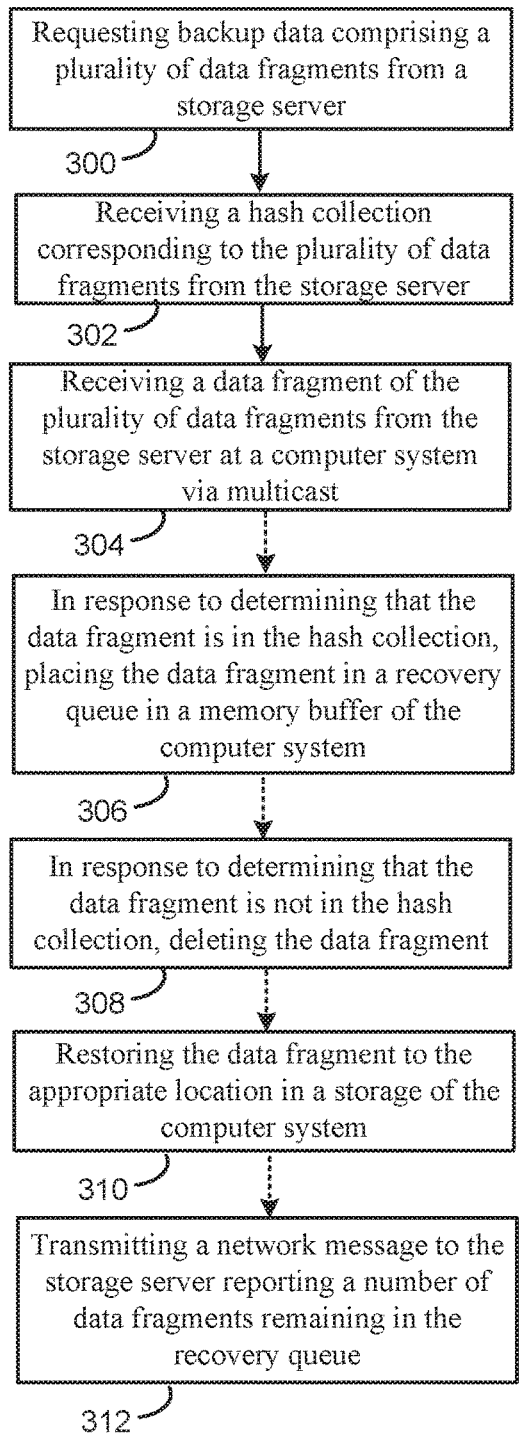
FIG. 3 is also diagrammatic flowchart illustrating an example implementation of the present disclosure.

Parallel recovery process 10 may transmit 208 a collection of hashes corresponding to the backup data from the storage server (e.g., storage server 400) to a computer system (e.g., computer system 408) requesting the backup data. For example, storage server 400 may send the collection of hashes (i.e., hashed backups from, e.g., backups component 406) to the agent (e.g., agent 410) for operation of non-sequential recovery. Referring now also to FIG. 3, parallel recovery process 12 (via, e.g., agent 410 and/or computing system 408) may receive 302 a hash collection corresponding to the plurality of data fragments from the storage server. This collection may be used by agent 410 to determine if and where the corresponding data fragment is to be restored once it is received.

Parallel recovery process 10 may determine 202 a next data fragment of the backup data to be transmitted from the storage server to the plurality of computer systems (i.e., the computer systems in the network) based on an order of priority. The order of priority may be based (216) on the data fragments of the backup data which have been requested by the most computer systems. For example, parallel recovery process 10 and/or storage server 400 may select and/or identify the next data fragment to be sent based on an order of priority as described below.

Data fragments assigned to or requested by suspended agents (as discussed above) may be excluded from the order of priority. Further, a data fragment with a highest number of agents requesting it may be selected first in the order of priority. If there are multiple data fragments which have been assigned to or requested by active agents, the data fragment requested by the agent with shortest reported recovery queue may be prioritized next in the order of priority. If there are multiple data fragments with the highest number of agents requesting them, the data fragment with highest number of idle agents requesting it may be prioritized in the order of priority. If there are data fragments assigned to or requested by active agents which also are agents with shortest reported recovery queue, the data fragment requested by the agent which has been idle the longest may be prioritized next. If there are multiple data fragments with the highest number of agents requesting them, the data fragment with highest number of idle agents requesting it may be prioritized in the order of priority. If it is not definitive whether there are multiple data fragments with the highest number of agents requesting them and where the data fragment with highest number of idle agents requesting it may be prioritized, a random data fragment out of the identified set of data fragments may be prioritized next.

Based on the order of priority established for the data fragments as described above, parallel recovery process 10 may transmit 204 the next data fragment from the storage server (e.g., storage server 400) to the plurality of computer systems via a data fragment multicast stream. Further, parallel recovery process 10 may transmit 210 a hash corresponding to the next data fragment to the plurality of computer systems. For example, the multicast stream may be a single IP multicast stream to a predefined Class D IP Address and may include all required hashes and data fragments sent. In this way, storage server 400 may use a multicast stream to send a hash and corresponding data fragment to all the agents and/or corresponding computer systems in the network. The storage server may mark or designate all agents which need the selected data fragment as not idle (if they were idle), and may increase their assumed queue length by one. The storage server may also assess if any of the agents have reached a suspension threshold. If so the storage server may mark the agent as suspended.

Referring now to FIG. 3, parallel recovery process 12 may receive 304 a data fragment of the plurality of data fragments from the storage server (e.g., storage server 400) at a computer system (e.g., computer system 408) via multicast. An agent corresponding to the computer system may receive the data fragment and compare against the hash collection it recovers. In response to determining that the data fragment is in the hash collection, parallel recovery process 12 may place 306 the data fragment in a recovery queue in a memory buffer of the computer system. Further, in response to determining that the data fragment is not in the hash collection, parallel recovery process 12 may delete 308 the data fragment.

Further, parallel recovery process 12 and/or the agent of the computer system may checks the recovery queue. Parallel recovery process 12 may restore 310 the data fragment from the recovery queue to the appropriate location in a storage of the computer system. Parallel recovery process 12 and/or the agent of the computer system may use one or more optimization techniques to select the data fragment from the recovery queue in order to speed up the recovery and/or to reduce storage response delays. These techniques may include, but are not limited to: caching, buffering, and/or sorting the data by location on the target storage. After recovery to the storage is complete, the restored data fragment may be deleted from the recover queue.

Parallel recovery process 12 may transmit 312 a network message (from the computer system) to the storage server reporting a number of data fragments remaining in the recovery queue (of the computer system). In an implementation, for every X number of restored data fragments, and after a pre-defined timeout, the agent may send a network message to the storage server, which may report the number of data fragments in its recovery queue. In this way the agent may change its status (e.g., active or suspended) on the storage server. The storage server may suspend network sending if there are no active agents available until a time when at least a single agent reports queue size which qualifies it as active.

Parallel recovery process 10 may request 214 a recovery status from the plurality of computer systems via a "keep-alive" multicast stream. The "keep-alive" mechanism may ensure that one or more agents did not abort corresponding recovery operations. For example, for every X number of sent data fragments, the storage server may send a multicast "keepalive" network message to all the agents of computer systems on the network and may requesting the same status as discussed above. Further, if an agent does not reply to "keepalive" requests or report its corresponding recovery queue length after a predefined time, the particular recovery operation for the corresponding computer system may considered and/or designated as abandoned, and all the unique data fragments requested by the agent may be removed from the recovery queue. Additionally, the agent or agent ID may be removed from the collections of the duplicate data fragments.

Referring now to FIG. 6, a table illustrates a portion of an example recovery process in accordance with the present disclosure. For example, in step 1, an Agent A corresponding to a computer system on a network may start a recovery process and may requests Backup A1, which may include of data fragments X, Y and Z. As such, the Hash Queue may be updated to reflect that data fragments X, Y, and Z are needed by Agent A for recovery. Further, in step 2, the storage server may send (via multicast) data fragment X to all the computer systems in the network and may remove data fragment X from hash queue.

Continuing with the example above, in step 3, Agent B may initiate a recovery of the its corresponding computer system and may request Backup B1, which may include data fragments Z, Y, X and V. As such, the Hash Queue may be updated to reflect that data fragments Z, Y, X and V are needed by Agent B for recovery. Further, in step 4, the storage server may send (via multicast) data fragment Y to all the computer systems in the network and may remove data fragment Y from hash queue. Additionally, in step 5, the storage server may send (via multicast) data fragment Z to all the computer systems in the network and may remove data fragment Z from the hash queue. Moreover, in step 6 the storage server may send (via multicast) data fragments X and V to all the computer systems in the network and may remove data fragments X and V the hash queue, leaving it empty. As shown in FIG. 6, the computer systems in the network have requested 7 data fragments from the storage server and, as a result of using some of the techniques and features described in the present disclosure, only 5 data fragments were sent over the network for successful recovery.

In an embodiment, the backup storage described in the present disclosure may not necessarily have to be deduplicated as the approaches described herein apply as long as a backup storage is divided into data fragments and corresponding hashes are used for example to create redundancy using Reed-Solomon algorithms.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for parallel computer system recovery comprising:
   receiving requests for backup data at a storage server from a plurality of computer systems to be recovered;
   determining a next data fragment of the backup data to be transmitted from the storage server to the plurality of computer systems based on an order of priority; and
   transmitting the next data fragment from the storage server to the plurality of computer systems via a data fragment multicast stream.

2. The method of claim 1, further comprising:
   adding a collection of hashes corresponding to the backup data to a hash queue at the storage server.

3. The method of claim 1, further comprising:
   transmitting a collection of hashes corresponding to the backup data from the storage server to a computer system requesting the backup data.

4. The method of claim 1, further comprising:
   transmitting a hash corresponding to the next data fragment to the plurality of computer systems.

5. The method of claim 1, further comprising:
   receiving the requests for backup data from the plurality of computer systems at near the same time for synchronous recovery of the plurality of computer systems.

6. The method of claim 1, further comprising:
   receiving the requests for backup data from the plurality of computer systems at different times for asynchronous recovery of the plurality of computer systems.

7. The method of claim 1, further comprising:
   requesting a recovery status from the plurality of computer systems via a keep-alive multicast stream.

8. The method of claim 1, wherein the order of priority is based on the data fragments of the backup data which have been requested by the most computer systems.

9. A method for parallel computer system recovery comprising:
   requesting backup data comprising a plurality of data fragments from a storage server;
   receiving a hash collection corresponding to the plurality of data fragments from the storage server;
   receiving a data fragment of the plurality of data fragments from the storage server at a computer system via multicast; and
   in response to determining that the data fragment is in the hash collection, placing the data fragment in a recovery queue in a memory buffer of the computer system.

10. The method of claim 9, further comprising:
    in response to determining that the data fragment is not in the hash collection, deleting the data fragment.

11. The method of claim 9, further comprising:
restoring the data fragment to the appropriate location in a storage of the computer system.

12. The method of claim 9, further comprising:
transmitting a network message to the storage server reporting a number of data fragments remaining in the recovery queue.

13. A computer program product residing on a computer readable storage medium having a plurality of instructions stored thereon, which, when executed by a processor, cause the processor to perform operations for parallel computer system recovery, the operations comprising
receiving requests for backup data at a storage server from a plurality of computer systems to be recovered;
determining a next data fragment of the backup data to be transmitted from the storage server to the plurality of computer systems based on an order of priority; and
transmitting the next data fragment from the storage server to the plurality of computer systems via a data fragment multicast stream.

14. The computer program product of claim 13, further comprising:
adding a collection of hashes corresponding to the backup data to a hash queue at the storage server.

15. The computer program product of claim 13, further comprising:
transmitting a collection of hashes corresponding to the backup data from the storage server to a computer system requesting the backup data.

16. The computer program product of claim 13, further comprising:
transmitting a hash corresponding to the next data fragment to the plurality of computer systems.

17. The computer program product of claim 13, further comprising:
receiving the requests for backup data from the plurality of computer systems at near the same time for synchronous recovery of the plurality of computer systems.

18. A computing system for parallel computer system recovery, the computing system comprising one or more processors, wherein the one or more processors are configured to:
receive requests for backup data at a storage server from a plurality of computer systems to be recovered;
determine a next data fragment of the backup data to be transmitted from the storage server to the plurality of computer systems based on an order of priority; and
transmit the next data fragment from the storage server to the plurality of computer systems via a data fragment multicast stream.

19. The computing system of claim 18, wherein the one or more processors are further configured to:
add a collection of hashes corresponding to the backup data to a hash queue at the storage server.

20. The computing system of claim 18, wherein the one or more processors are further configured to:
transmit a collection of hashes corresponding to the backup data from the storage server to a computer system requesting the backup data.

* * * * *

UNITED STATES PATENT AND TRADEMARK OFFICE
CERTIFICATE OF CORRECTION

PATENT NO. : 9,846,622 B1  
APPLICATION NO. : 14/986184  
DATED : December 19, 2017  
INVENTOR(S) : Stanislav Roguine et al.

Page 1 of 1

It is certified that error appears in the above-identified patent and that said Letters Patent is hereby corrected as shown below:

On the Title Page

Item (72) Inventors: delete "ProtaSov" and insert --Protasov--, therefor.

Signed and Sealed this  
Third Day of April, 2018

Andrei Iancu  
*Director of the United States Patent and Trademark Office*